United States Patent [19]

Yamasaki et al.

[11] Patent Number: 5,423,988

[45] Date of Patent: Jun. 13, 1995

[54] METHOD AND APPARATUS FOR TREATING DEVELOPER-CONTAINING WASTE WATER AT MULTIPLE BIOLOGICAL TREATMENT STAGES

[75] Inventors: Kazuyuki Yamasaki, Hiroshima; Yoshihiro Hamaguchi, Kurashiki; Shunji Hosoda, Fukuyama; Kazuyuki Sakata, Fukuyama; Satoshi Nishio, Fukuyama; Takamasa Uchiyama, Fukuyama, all of Japan

[73] Assignee: Sharp Kabushiki Kaisha, Osaka, Japan

[21] Appl. No.: 141,670

[22] Filed: Oct. 27, 1993

[30] Foreign Application Priority Data

Oct. 29, 1992 [JP] Japan .................................. 4-291182
Jan. 11, 1993 [JP] Japan .................................. 5-002554

[51] Int. Cl.6 .............................................. C02F 3/06
[52] U.S. Cl. .................... 210/611; 210/615; 210/617; 210/151; 210/206; 210/625
[58] Field of Search .............. 210/150, 151, 202, 206, 210/259, 611, 615, 617, 624, 625, 626, 631

[56] References Cited

U.S. PATENT DOCUMENTS

| | | | |
|---|---|---|---|
| 3,764,524 | 10/1973 | Stankewich, Jr. | 210/624 |
| 3,923,656 | 12/1975 | Krebs et al. | 210/151 |
| 4,173,531 | 11/1979 | Matsch et al. | 210/624 |
| 4,209,390 | 6/1980 | Cabane et al. | 210/615 |
| 4,469,599 | 9/1984 | Gros et al. | 210/150 |
| 4,680,111 | 7/1987 | Ueda | 210/615 |

FOREIGN PATENT DOCUMENTS

| | | |
|---|---|---|
| 4001482 | 4/1991 | Germany . |
| 64-43306 | 2/1989 | Japan . |
| 1-95000 | 4/1989 | Japan . |

Primary Examiner—Christopher Upton
Attorney, Agent, or Firm—Nixon & Vanderhye

[57] ABSTRACT

Developer-containing waste water is subjected to a multi-stage biological treatment. A waste water treatment apparatus for carrying out a two-stage biological treatment has an adjustment tank for receiving raw waste water and for preliminarily adjusting water quality of the waste water. First and second contact aeration tanks are used to biologically treat the waste water. First and second settling tanks are connected to the first and second contact aeration tanks for separating by sedimentation sludge from the waste water. Specifically, the first settling tank is connected to the second contact aeration tank. Sludge separated from the waste water is returned from the first and second settling tanks to first and second mixing tanks, respectively, and mixed with *Bacillus Subtilis* Kubota (BSK) and excess household sludge. The mixture is aerated and then transferred to the first and second contact aeration tanks, respectively. The aerated mixture in the first mixing tank is also transferred to the adjustment tank in accordance with the water quality of the raw waste water.

36 Claims, 6 Drawing Sheets

METHOD AND APPARATUS FOR TREATING DEVELOPER-CONTAINING WASTE WATER AT MULTIPLE BIOLOGICAL TREATMENT STAGES

BACKGROUND OF THE INVENTION

1. Field of the Invention

The present invention relates to treatment of waste water containing highly toxic developers and surfactants used in great amounts in semiconductor factories, liquid-crystal factories, and other various types of industrial facilities and more particularly to a developer-containing waste water treatment method and apparatus having a plurality of biological treatment stages.

2. Description of the Prior Art

Generally, developer-containing waste water exhausted from semiconductor factories, liquid-crystal factories, and other various types of industrial facilities has a high toxicity when its primary component is tetramethyl ammonium hydroxide (hereinafter, referred to as "TMAH"). Furthermore, the waste water contains large amounts of surfactants. For these reasons, it is difficult to biologically treat such waste water with microorganisms.

Conventionally, in order to give such waste water a biological treatment at a factory from which the waste water is produced, it is diluted until its concentration gets low enough for the biological treatment. Otherwise, the waste water is transported to an incinerating equipment located at a different place, where it is incinerated. The incineration is a reliable disposal method of waste water, but involves the transportation cost to the incineration facilities, a danger of traffic accidents during the transportation, and the incineration cost.

Furthermore, as the semiconductor factories and liquid-crystal factories become larger in scale and produce larger amounts of developer-containing waste water each day, the incineration of waste water causes the following problems. First, the construction cost of incineration facilities increases. Second, the cost of transportation of the waste water to the incineration facilities located at a different place increases. Third, when heavy oil is used as a fuel for the incineration, the fuel cost increases. In addition, the costs of measures to be taken against air pollution also increase. The maintenance of the incineration facilities also becomes more expensive. Besides, the incineration treatment itself involves waste of energy, which means that the incineration treatment is no longer a method suitable for these days when protection of the earth environment is called for.

Figure 1:
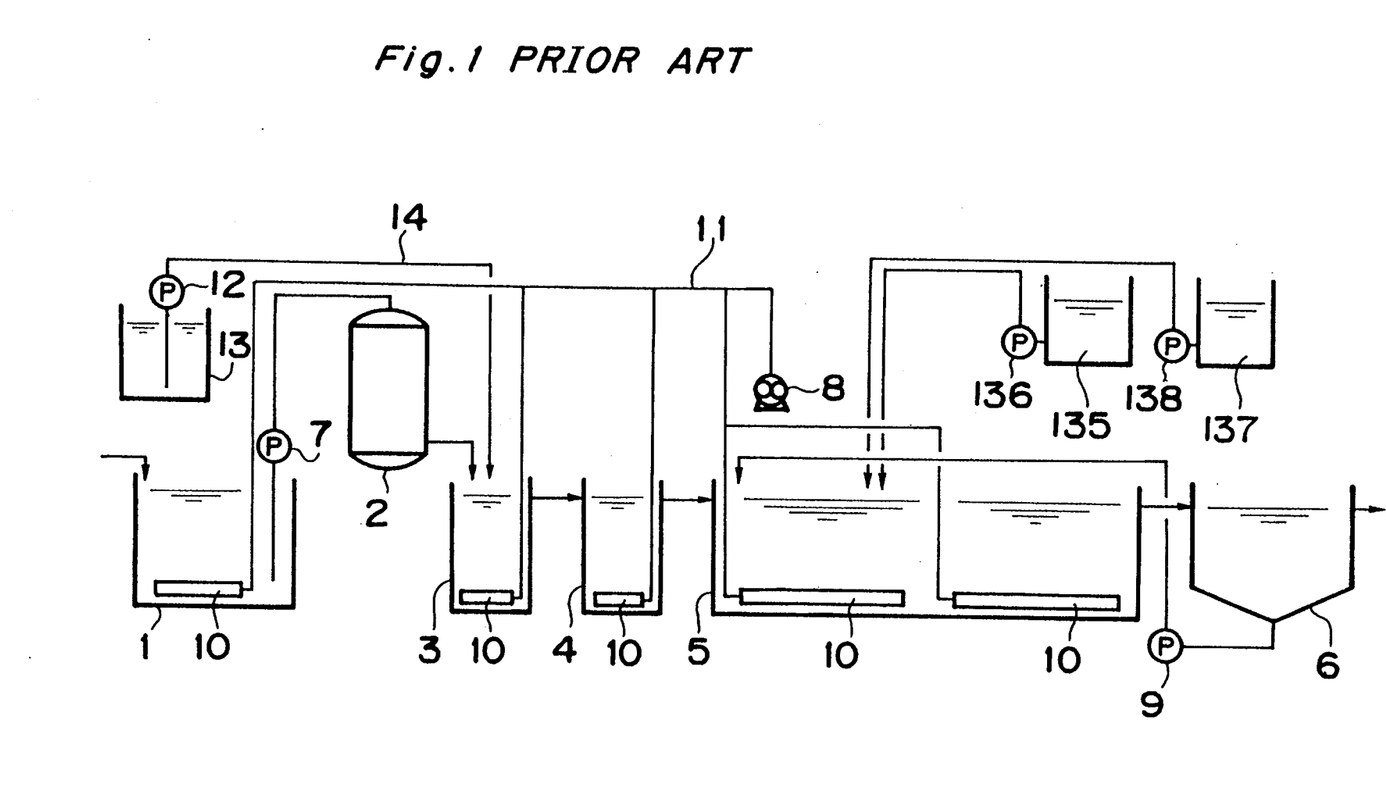
FIG. 1 is a schematic diagram of a prior art waste water treating apparatus for treating developer-containing waste water.

FIG. 1 shows a prior art waste water treating apparatus which dilutes a TMAH-containing waste water and biologically treats the diluted waste water. In the waste water treating apparatus shown in FIG. 1, the raw developer-containing waste water first flows into an adjustment tank 1 before being treated. This is because water quality and quantity of waste water flowing into the apparatus are different at different times and it is not advisable to introduce such variable raw waste water directly into a tank to treat it. The adjustment tank 1 has an air diffuser pipe 10 installed therein. The raw developer-containing waste water in the adjustment tank 1 is stirred by air emitted from an air diffuser pipe 10 so that different water qualities of waste water flowing at different times are made uniform in the adjustment tank. In other words, water quality is adjusted. Water quantity is also adjusted. The adjusted developer-containing waste water is transferred by a pump 7 to an adsorption column 2, where surfactants contained in the developer-containing waste water are mainly adsorbed on activated carbon. The developer-containing waste water treated in the adsorption column 2 is then introduced into a dilution tank 3, to which diluent water previously stored in a diluent water storage tank 13 is injected by a pump 12, whereby the developer-containing waste water is diluted. The dilution depends on the TMAH concentration of the waste water, but is generally set at 10 times or so in most factories. As a matter of course, waste water is diluted until TMAH contained therein becomes biologically treatable. The waste water sufficiently diluted in the dilution tank 3 is neutralized in a neutralization tank 4 having an air diffuser pipe 10 installed therein. Since the developer itself is alkaline, an acid is added for the neutralization of the developer-containing waste water even after dilution. The waste water in the neutralization tank 4 is agitated by air emitted from the air diffuser pipe 10.

In FIG. 1, numeral 5 denotes an aeration tank 5. TMAH contained in the developer-containing waste water is treated primarily in this aeration tank 5. The air set forth from the blower 8 and output from the air diffuser 10 keeps the interior of the aeration tank 5 aerobic. Within the aeration tank 5, aerobic microorganisms live and breed.

Further, in FIG. 1, numeral 135 denotes a urea storage tank, and numeral 137 denotes a phosphoric acid storage tank. The urea storage tank 135 and the phosphoric acid storage tank 137 have their respective pumps 136, 138. Urea is fed from the urea storage tank 135 to the aeration tank 5, while phosphoric acid is fed from the phosphoric acid storage tank 137 to the aeration tank 5.

As stated above, TMAH is toxic and difficult to biologically treat. Therefore, the volumetric load of TMAH per unit volume of the aeration tank 5 is restricted to a small value. Accordingly, the volume of the aeration tank 5 needs to be relatively large.

Since TMAH is to microorganisms as noted above, nutritive agents such as urea and phosphoric acid are supplied in greater amounts in the treatment of TMAH than in the treatment of harmless organic substances. Also, TMAH being a toxic substance, the volumetric load of TMAH applied to the aeration tank 5 per day needs to be controlled to approx. 1 kg or less for 1 $m^3$ of the aeration tank. Generally, waste water treating equipment having an inflow load of 1 kg or less per $m^3$ of the aeration tank is relatively large for the waste water amount to be treated.

In FIG. 1, a settling tank 6, separates sludge containing aerobic microorganisms from supernatant liquid. Adjacent to the settling tank 6 is a sludge return pump 9 which serves to return to the aeration tank 5 the sludge containing aerobic microorganisms that have settled in the settling tank 6.

In the waste water treatment apparatus utilizing microorganisms, shown in FIG. 1, since the TMAH concentrations of developer-containing waste water from semiconductor factories are generally as high as approx. 2000 ppm to 10000 ppm, the developer-containing waste water is diluted as much as 10 times or so on average. Thus, the amount of the diluted waste water becomes so large that the size of the aeration tank 5 and the settling tank 6 increases. As a result, the waste water treatment apparatus increases in scale and therefore initial costs increase.

The operational cost of the above prior art waste water treatment apparatus of FIG. 1 is also high for the following reasons. Because of the increased size of the aeration tank 5, the blower 8 is required to set forth a large amount of air especially to agitate the waste water in the aeration tank 5 as well as to maintain aerobic microorganisms therein. Thus, the operation of the blower 8 consumes considerable electric power. In addition, in order to maintain microorganisms in a good condition in the aeration tank 5 against the toxicity of TMAH, it is necessary to feed the microorganisms with nutritive agents such as urea and phosphoric acid.

In the biological treatment of the waste water, if the condition of microorganisms deteriorates, the waste water within the waste water treating facilities such as the aeration tank 5 or the settling tank 6 is consigned to a dealer as an emergency measure. In this case, because the water quantities in the aeration tank 5 and the settling tank 6 are so large, the disposal cost is high.

The developer-containing waste water contains not only TMAH but also great amounts of various surfactants. Although those surfactants, which are mainly alkyl ammonium-based or polyoxyethylene-based, are necessary chemical substances for a development process in the semiconductor and liquid-crystal manufacturing processes, they cause other new problems in the biological waste water treatment. For example, surfactants prevent aerobic microorganisms from decomposing TMAH, due to their germicidal action on the microorganisms. In addition, the surfactants cause water to foam. This is why in the prior art the adsorption treatment of surfactants using activated carbon is performed in the adsorption column 2 as a pretreatment of the waste water. However, since the surfactants in the developer-containing waste water are at high concentrations and the adsorption ability of the activated carbon generally is limited, it is necessary to regenerate the activated carbon in a short time cycle. For the regeneration, the activated carbon is taken out from the adsorption column. After regenerated, the activated carbon is restored to the adsorption column. The work related to the regeneration of the activated carbon involves considerable labor and regeneration costs. The running cost and maintenance cost of the waste water treating facilities accordingly increase.

It is expected that as the microfabrication progresses in semiconductor and liquid crystal apparatus, surfactants will be contained in various types of chemicals including developers for the purpose of performance enhancement in the development process, i.e. yield enhancement In addition, governmental regulation of specific fluorocarbons has a great impact on the electronics industry. On this account, various types of cleaning agents are being discussed as the alternative to conventional fluorocarbon-based cleaning agents, and attention is given to cleaning agents containing a) ultra-pure water and surfactants, b) limonene and surfactants, and c) a silicone solvent and surfactants, taking into consideration cleaning power and the risk of damaging parts to be cleaned.

The amounts and kinds of surfactants to be used in the electronics industry tend to increase, whether the surfactants are used in the alternative cleaning agents or in chemicals such as developers. There is also the possibility that semiconductor and liquid crystal manufacturing processes require use of surfactants which are difficult to biologically treat or that the amounts of surfactants to be used increase to such a level that they are difficult to biologically treat.

Recently environmental protection regulation is growing stricter. Current requirements imposed on waste water treating facilities is that waste water, even when discharged directly into rivers or seas, should not affect creatures living there, such as fish. However, since TMAH is a nitrogen compound, a simple biological treatment of TMAH-containing waste water decomposes TMAH to ammonia nitrogen and nitrite nitrogen which exhibit toxicity to fish. As a result, the waste water biologically treated contains those toxic substances, so that fish cannot live in such water. In order for fish to live in treated water, all of the following three requirements should be satisfied.

1) the water should be neutral;
2) the ammonia nitrogen and nitrite nitrogen concentrations of the water should be 1 ppm or lower; and
3) nitrogen compounds derived from TMAH should have been completely oxidized into nitrate nitrogen.

However, with conventional biological waste water treatment methods such as an activated sludge method, it is impossible to treat waste water containing a developer and surfactant such that all of the above three requirements are satisfied. For example, waste water treated by the activated sludge method contains ammonia nitrogen and nitrite nitrogen at high concentrations, and has a poor transparency, and the SS (suspended solids) concentration is above 10 ppm. To the knowledge of the inventors, there are no waste water treating facilities that are efficient, economical and compact and that meet the foregoing requirements for the treated waste water enabling fish to live therein.

Large-scale semiconductor and liquid crystal factories have their own facilities for treating household waste water derived from dining rooms, baths, lavatories, etc. used by employees. The household waste water treating facilities produce excess sludge having good nutritive balance. Hitherto, however, there has been no particular way for making effective use of such excess sludge in the semiconductor and liquid crystal factories, with the excess sludge requiring costly disposal.

As shown above, rational treatment methods for wastes derived from factories such as semiconductor and liquid crystal factories are today's.

SUMMARY OF THE INVENTION

The object of the present invention is therefore to provide a method and apparatus for treating developer-containing waste water for rationally and economically treating the developer-containing waste water with less space and less cost through using excess house sludge.

In order to accomplish the above object, a method for treating developer-containing waste water according to an aspect of the present invention comprises the following steps:

(a) preliminarily adjusting water quality of raw developer-containing waste water in an adjustment tank;

(b) treating the preliminarily adjusted waste water with microorganisms in a first biological tank while aerating it;

(c) separating by sedimentation sludge from the waste water, and transferring the waste water, which is a supernatant, to a second biological tank;

(d) mixing the sludge separated at step (c) with a household excess sludge and *Bacillus subtilis*, aerating the mixture and transferring the aerated mixture to said first biological tank, said *Bacillus subtilis* having a stickiness ability to adhere to a carrier and an ability to deodorize and decompose organic substances;

(e) treating the waste water transferred to said second biological tank with microorganisms and calcium carbonate mineral while aerating the waste water;

(f) separating by sedimentation sludge from the waste water treated at step (e); and (g) mixing the sludge separated at step (f) with a household excess sludge and *Bacillus subtilis*, aerating the mixture and transferring the aerated mixture to said second biological tank.

This waste water treatment method can be carried out by an apparatus for treating developer-containing waste water which comprises:

an adjustment tank having means for agitating raw waste water such that water quality of the waste water is adjusted;

a first biological tank having aeration means for biologically treating the waste water from said adjustment tank with microorganisms while aerating the waste water;

a first settling tank for separating sludge from the waste water from said first biological tank;

a first mixing tank for mixing the sludge from said first settling tank with excess household sludge and *Bacillus subtilis*, aerating the mixture and transferring the aerated mixture to said first biological tank, said *Bacillus subtilis* having a stickiness ability to adhere to a carrier and an ability to deodorize and decompose organic substances;

a second biological tank for biologically treating the waste water from said first settling tank while aerating the waste water, said second biological tank being packed with calcium carbonate mineral;

a second settling tank for separating sludge from the waste water coming from said second biological tank;

a second mixing tank for mixing the sludge from said second settling tank with the excess household sludge and *Bacillus subtilis*, aerating the mixture and transferring the aerated mixture to said second biological tank; and aeration means for aerating the waste water in said first and second biological tanks and said first and second mixing tanks.

In this apparatus, the aerated mixture of the return sludge from the first settling tank, *Bacillus subtilis* and excess household sludge is returned to the first biological treatment tank and similarly the aerated mixture of the return sludge from the second setting tank, *Bacillus subtilis* and household excess sludge is returned to the second biological treatment tank. Since *Bacillus subtilis* such as *Bacillus subtilis* Kubota (BSK) is an aerobic bacterium which exists in the nature, it grows well and its population increases in the first and second mixing tanks each having the aeration means. The aeration means allow sufficient mixing of the household excess sludge, *Bacillus subtilis*, and the return sludge. Further, since the nutritively well balanced excess household sludge and substances secreted from microorganisms contained in the excess sludge serve as a nutrient for *Bacillus subtilis*, the household excess sludge is aerobically digested and treated by the bacterium, while the increased population of the bacterium is maintained within the first and second mixing tanks. As a result, an activated sludge composed principally of *Bacillus subtilis*, such as BSK, is newly created within the first and second mixing tanks. Since the household excess sludge which may require a large cost of treatment can be advantageously utilized or recycled as nutrients for microbial growth, weight reduction of wastes is possible. In addition, costs for disposal of the household excess sludge are eliminated. To the knowledge of the inventors, such excess household sludge has not been recycled in this manner.

Since *Bacillus subtilis* is maintained at a high concentration, microbial or biological treatment can be stably carried out within the first and second biological treatment tanks against fluctuation in water quality of inflow waste water. Further, the microorganism concentration within the first biological treatment tank is high, microorganisms themselves act as buffer substances to the fluctuation in water quality of inflow water, thus making a reaction adjustment.

Furthermore, since *Bacillus subtilis* is maintained at a high density, microbial treatment can be effected within the first and second biological treatment tanks without diluting the developer-containing waste water. Accordingly, as compared with the prior-art example, the first and second biological treatment tanks can be downsized, thus allowing the construction cost to be reduced to a substantial extent.

The return sludge from the first and second settling tanks has been already acclimated or adapted to TMAH and surfactants contained in the developer-containing waste water, substances such as TMAH, ammonia nitrogen and nitrite nitrogen etc. derived from TMAH, and surfactants can be biologically treated with high efficiency within the first and second biological treatment tanks by the new activated sludge composed principally of *Bacillus subtilis* and created within the first and second mixing tanks.

The waste water is neutralized by the calcium carbonate mineral in the second biological treatment tank. Neutralization of the waste water is also attributable to aerobic microorganisms such as *Bacillus subtilis* which grow on the surface of the calcium carbonate mineral. That is, the calcium carbonate mineral serves as not only a neutralizer but also an immobilizing carrier for such microorganisms because the surface of the calcium carbonate mineral facilitates spontaneous generation of microorganisms.

In the present application, the term "microorganisms" are used broadly and include bacteria, fungi, protozoa, algae, etc.

The first and second biological treatment tanks may be provided with sludge carrying means for carrying a sludge thereupon so as to immobilize the sludge. In this case, a sludge containing microorganism such as *Bacillus subtilis* adheres to the carrying means and is immobilized due to the stickiness of *Bacillus subtilis*. As a result, stability of the microorganisms within the tanks is greatly enhanced and the microorganisms are maintained at a high concentration or density in the tanks, as compared with the prior-art example. Accordingly, the microbial treatment capability is increased.

Within the first and second biological treatment tanks having the sludge carrying means therein, there exist newly activated sludge that floats in large flocks as well as new activated sludge sticking and fixed to the sludge carrying means. That is, since the microorganism concentration is maintained at a high level within the tanks, both fixed and floating states of the microorganisms are ensured.

In this way, the first and second biological treatment tanks become excellent contact aeration tanks.

The first and second biological treatment tanks are advantageous in that, besides their enhanced treatment performance by virtue of high microorganism concentration, they have both merits of a contact oxidation tank that it has treatment stability and oxidizes ammonia nitrogen and nitrite nitrogen, and a merit of aeration tanks that excellent mixing reaction between waste water and microorganisms can be attained in a short time by air agitation.

Also, since the newly activated sludge is of large and strong flocks, as compared with conventional activated sludge, as far as seen with the unaided eye, it exhibits successful solid-liquid separation within the settling tanks, helping to improve water quality of treated water.

In an embodiment of the present invention, *Bacillus subtilis* Kubota (BSK) is used. This bacterium exists in nature, and its colonies have a stickiness quality. Therefore the sludge containing this bacterium easily adheres to the sludge carrying means in the tanks. BSK is an aerobic bacterium, and therefore is highly capable of eliminating odor so that BSK effectively removes odor emitted from the household excess sludge. Other kinds of *Bacillus subtilis* can be used as far as they have this stickiness quality and the ability to deodorize and decompose organic substances.

In an embodiment, vinylidene chloride is used as the sludge carrying means because it provides a fibrous element having a multiplicity of looped portions, which configuration provides a large surface area to which the sludge attaches. It has been established from experiments that newly activated sludge adheres well to the vinylidene chloride. Other copolymer materials may also be used which have large surface area and to which new activated sludge composed principally of *Bacillus subtilis* easily stick.

When the second biological treatment tank is packed with both calcium carbonate fillers and the sludge carrying means, it is difficult to move or agitate the waste water in the tank. In view of this, according to another aspect of the present invention, the calcium carbonate and the sludge carrying means are separated. Thus, an apparatus for treating developer-containing waste water according to this aspect of the invention comprises:

an adjustment tank having means for agitating raw waste water such that water quality of the waste water is adjusted;

a first biological tank for biologically treating the waste water from said adjustment tank with microorganisms while aerating the waste water, said first biological tank having sludge carrying means for carrying a microorganisms-containing sludge thereupon so as to immobilize the sludge;

a first settling tank for separating a sludge from the waste water coming from said first biological tank;

a first mixing tank for mixing the sludge coming from said first settling tank with household sludge and *Bacillus subtilis*, aerating the mixture and transferring the aerated mixture to said first biological tank, said *Bacillus subtilis* having a stickiness quality for adhering to a sludge carrier and an ability to deodorize and decompose organic substances;

a second biological tank for biologically treating the waste water from said first settling tank while aerating the waste water, said second biological tank having sludge carrying means for carrying a microorganisms-containing sludge thereupon so as to immobilize the sludge;

a third biological tank for biologically treating the waste water from said third biological tank while aerating the waste water, said third biological tank being packed with calcium carbonate mineral;

a second settling tank for separating a sludge from the waste water from said third biological tank;

a second mixing tank for mixing the sludge coming from said second settling tank with household sludge and *Bacillus subtilis*, aerating the mixture and transferring the aerated mixture to said second biological tank; and aeration means for aerating the waste water in said first, second and third biological tanks, and said first and second mixing tanks.

This construction makes it easy for waste water in the second and third biological treatment tanks to be moved or agitated.

In order to enhance this effect, in an embodiment of the present invention, the third biological tank has multiple mesh tubes. These multiple mesh tubes are arranged horizontally and vertically and spaced from each other. The calcium carbonate mineral is placed in spaces between the mesh tubes. In this case, water flow which occurs due to air discharged by aeration means is passed through the inside of the mesh tubes. Due to this, resistance to the water flow during the aeration is smaller than when the mesh tubes are not present, so that the third biological treatment tank positively accomplishes the contact-mixing and agitation. The mesh tubes are made of, for example, vinyl chloride or polyethylene, and are capable of oxidizing ammonia nitride and nitrite nitrogen by microorganisms sticking to the surface of the mesh tubes. Further, agitation of the waste water in the third contact aeration tank collects suspended solids (SS), i.e., floating substances, to the calcium carbonate mineral. Activated carbon may be also used. Then the SS collecting effect will be enhanced. In the third biological treatment tank ammonia nitrogen and nitrite nitrogen, which are toxic to fish, are oxidized into nitrate nitrogen by microorganisms which stick to and grow on the mesh tubes and calcium carbonate mineral (and activated carbon). Furthermore, in the third contact aeration tank, the final treatment of the surfactants is effected by such microorganisms.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The present invention is now described in detail with reference to embodiments thereof illustrated in the accompanying drawings.

Figure 2:
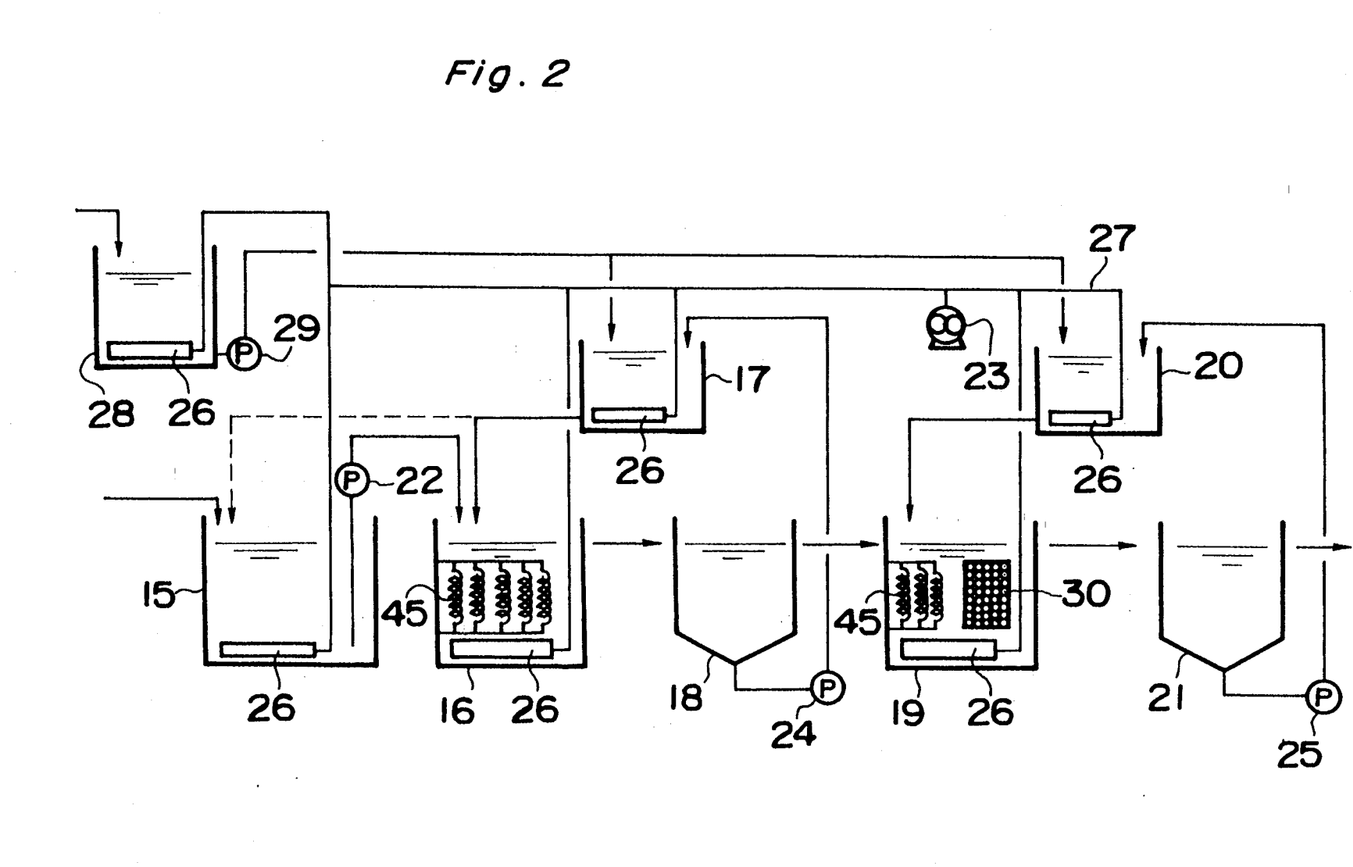
FIG. 2 is a schematic diagram of an apparatus for treatment of developer-containing waste water according to an embodiment of the present invention.

FIG. 2 shows an embodiment of the apparatus for treating developer-containing waste water according to the present invention. This embodiment, as shown in FIG. 2, comprises, as its main component units, an adjustment tank 15 into which raw developer-containing waste water derived from a factory flows first, a first contact/aeration tank 16 as a first biological tank, a first settling tank 18, a second contact/aeration tank 19 as a second biological tank, and a second settling tank 21. The first contact/aeration tank 16 is packed with fibrous vinylidene chloride fillers 45, while the second contact/aeration tank 19 is packed with both the fibrous vinylidene chloride fillers 45 and calcium carbonate mineral (i.e., calcite or limestone bed) 30. The calcium carbonate mineral 30 is grinds of natural limestone, which are commercially available as heavy calcium carbonate or under the trade name of "Kansuiseki". Calcium carbonate mineral, a material that exists in nature, is such a chemically safe material that fish can be raised in its aqueous solution. Calcium carbonate mineral has a rough surface that facilitates microbial growth. The adjustment tank 15 and the first and second contact/aeration tanks 16, 19 each are equipped with an air diffuser pipe 26 for agitating waste water therein. Water in the first and second contact/aeration tanks 16, 19 is kept aerobic by the agitation thereof.

The waste water treating apparatus of FIG. 2 is not provided with a dilution tank 3 as shown in FIG. 1, but so arranged as to introduce developer-containing waste water, without diluting it, directly from the adjustment tank 15 into the first contact/aeration tank 16 by a pump 22.

Further, the present apparatus is provided with an excess sludge storage tank 28, to which *Bacillus subtilis* Kubota (BSK) and household excess sludge are introduced. The excess sludge storage tank 28 is also equipped with an air diffuser pipe 26.

The present apparatus is also provided with a first mixing tank 17 having an air diffuser pipe 26, to which return sludge is transferred from the first settling tank 18 and to which BSK and household excess sludge are transferred by a pump 29 from the excess sludge storage tank 28. The first mixing tank 17 is for mixing together and aerating the return sludge, BSK, and household excess sludge, the aerated mixture of the return sludge, BSK, and household excess sludge being normally transferred to the first contact/aeration tank 16.

The present embodiment is further provided with a second mixing tank 20 having an air diffuser pipe 26, to which return sludge is transferred from the second settling tank 21, and to which BSK and household excess sludge are also transferred from the excess sludge storage tank 28. The second mixing tank 20 mixes and aerates the return sludge, BSK, and household excess sludge together, and returns the aerated mixture of the return sludge, BSK, and household excess sludge to the second contact/aeration tank 19, as the first mixing tank 17 does.

Using the invention apparatus of FIG. 2, developer-containing waste water is treated in the following manner.

Raw developer-containing waste water coming from the factory has different water qualities and quantities at different times. It is not good to introduce waste water of different qualities and quantities directly into the first contact/aeration tank. Therefore, the waste water coming from the factory is first received in the adjustment tank 15 such that the waste water quality is preliminarily adjusted to some extent and that the waste water of an almost same quantities is given to the first contact/aeration tank. The developer-containing waste water that has flowed into the adjustment tank 15 is stirred by air set forth from a blower 23 and discharged from the air diffuser pipe 26. The stir should not be very strong because otherwise the waste water would foam due to surfactants contained therein. The retention time for the waste water in the adjustment tank 15 is generally set at 6 hours or more, though it may vary depending upon fluctuations in the quality and quantity of influent waste water.

The developer-containing waste water is then introduced from the adjustment tank 15 to the first contact/aeration tank 16 by the pump 22, and biologically treated there. The retention time of the waste water in this tank 16 is desirably 12 hours or more although it is changed depending on the TMAH and surfactants concentrations of the waster water.

Waste water in the first contact/aeration tank 16, maintained at a constant water level, is agitated by air discharged from the air diffuser pipe 26 and kept aerobic. Further, to this first contact/aeration tank 16 are normally returned three things, return sludge from the first settling tank 18, household excess sludge, and BSK from the excess sludge storage tank 28 after sufficiently mixed and aerated in the first mixing tank 17.

BSK grows more easily than bacteria contained in the activated household sludge. Therefore, if the apparatus is kept operating as described above for a month or longer, the first contact/aeration tank 16 will become a tank containing principally BSK that has grown taking household excess sludge and the like as nutrients. In other words, the first contact/aeration tank 16 becomes a bioreactor consisting principally of BSK. Because colonies of BSK have a stickiness or adhesion quality, a large amount of newly activated sludge composed principally of BSK will stick to the vinylidene chloride fillers 45 in the first contact/aeration tank 16. Therefore, the microorganism concentration within the first contact/aeration tank 16 of this embodiment increases with time and becomes far higher than that of the aeration tank 5 of the FIG. 1 apparatus implementing the conventional activated sludge method. Such a high microorganism concentration (the microorganism concentration is often referred to as MLSS (Mixed Liquor Suspended Solids) concentration) of the first contact/aeration tank 16 allows waste water containing a developer at a high concentration to be effectively treated without being diluted. In fact, there will arise no particular problems even if non-diluted developer-containing waste water is introduced into the first contact/aeration tank 16, whereas foams and white turbidity will take place in the conventional aeration tank if developer-containing waste water is introduced thereinto without being diluted, so that activated sludge itself cannot be maintained properly.

The household sludge serves as a nutrient balanced with respect to nitrogen and phosphorus for BSK, thus facilitating growth of BSK. Further, this household excess sludge settles well in the first settling tank 18.

Next, the waste water treated in the first contact/aeration tank 16 is introduced into the first settling tank 18, and sludge is separated from the waste water. Then the sludge is returned from the first settling tank 18 via the first mixing tank 17 to the first contact/aeration tank 16 by a pump 24. The sludge return rate is 100%. The role of this return sludge is to return TMAH contained in the developer-containing waste water and BSK that has been acclimated to surfactants to the first contact/aeration tank 16 for newly treating the developer-containing waste water. BSK is an aerobic microorganism, a kind of Bacillus subtilis (like Bacillus natto) which is one harmless bacteria which exist in nature. BSK is a short rod in morphology and, cells of BSK, presenting polymorphism have nuclei surrounded by cell membranes. Also, BSK is motile and has about 10 flagella. BSK is a Gram-positive acidophile. BSK will grow well under proper conditions of nutrients, temperatures, dissolved oxygen, etc. Besides, the new activated sludge composed principally of BSK has much higher deodorizing ability than conventional activated sludge containing no BSK, so that can effectively absorb the odor emitted from the household excess sludge. In other words, the new activated sludge composed principally of BSK exhibits a good deodorizing effect upon the odor emitted from the household excess sludge within the first mixing tank 17 and the first contact/aeration tank 16. A bioreactor is implemented by sticking BSK having the deodorization and TMAH treatment abilities to the vinylidene chloride fillers 45 disposed within the first contact/aeration tank 16, where BSK is cultured to high density. BSK having an increased population exerts effective treatment on surfactants and other organic substances such as polyol contained in the developer-containing waste water. Accordingly, when the water quality of the raw developer-containing waste water flowing into the adjustment tank 15 is extraordinarily bad, return sludge is in some cases returned from the first mixing tank 17 to the adjustment tank 15, as indicated by a broken line of FIG. 2, for pretreatment of the developer-containing waste water.

The pH value of the waste water flowing into the adjustment tank 15 is usually 12 or higher, being alkaline. In the adjustment tank 15, the pH value of the waste water therein, where TMAH has not been treated sufficiently, is in most cases not less than 11. However, the microorganism concentration in the first contact/aeration tank 16 is higher than that of the prior-art aeration tank 5, and the microorganisms are sticking adhering to the vinylidene chloride fillers 45 to be immobilized in the first contact/aeration tank 16. Accordingly, the alkalinity of the waste water in the first contact/aeration tank 16 is reduced by virtue of the microorganisms' buffer action, so that there will be no particular problem to the waste water treatment.

In the first contact/aeration tank 16 the alkalinity of the waste water is further reduced since nitrite nitrogen resulting from treatment of TMAH increases in the first contact/aeration tank 16. In addition, because surfactants are not yet treated in the adjustment tank 15, foaming by surfactants tends to take place in the adjustment tank 15. However, since the surfactants are treated in the first contact/aeration tank 16, less foaming occurs in the tank 16.

As described above, according to the present embodiment, since BSK is cultured and maintained at a high density in the first contact/aeration tank 16, TMAH and surfactants and other like organic substances in the waste water can be treated rationally and economically without diluting the waste water. More specifically, in the present embodiment, the first contact/aeration tank 16 is maintained at the microorganism concentration of substantially 10000 ppm or more.

Also, the present embodiment, in which surfactants are treated by microorganisms, does not require the regeneration cost and replacement cost of activated carbon, in contrast to the prior-art method as shown in FIG. 1 in which surfactants are adsorbed to activated carbon. As a result, according to the present embodiment, running costs as well as treatment costs can be much lower, compared with the prior-art example. Moreover, in the present embodiment, maintenance of the apparatus can be easily done.

Further, because household excess sludge and secretions from the excess sludge are utilized as nutrients for BSK, an amount of the household excess sludge to be disposed of at some cost is reduced.

Generally, the TMAH concentration of developer-containing waste water, although differing among factories and manufacturing processes, is in most cases within the range of 2000 ppm to 10000 ppm. Because of such high TMAH concentrations, in the prior-art method as shown in FIG. 1, before being introduced into the aeration tank 5 the developer-containing waste water is diluted in the dilution tank 3 and the TMAH concentration is lowered to 200 ppm to 1000 ppm so that biological treatment can be effected. In contrast to this, according to the present embodiment of the invention, the influent developer-containing waste water containing TMAH at a concentration of 2000 ppm to 10000 ppm is biologically treated in the first contact/aeration tank 16 without being diluted and the TMAH concentration is lowered to 1000 ppm-200 ppm.

The inflow load of TMAH introduced into the first contact/aeration tank 16 is desirably not more than 1.5 kg-TMAH/m$^3$ of tank/day. That is, the capacity load of the first contact/aeration tank 16 is 1.5 kg—TMAH/m$^3$/day or less.

The developer-containing waste water, which has been treated till the TMAH concentration becomes 200 ppm to 1000 ppm, is then introduced from the first settling tank 18 into the second contact/aeration tank 19 and treated until a target treated water quality is obtained. The calcium carbonate 30 fillers serve as a neutralizer for neutralizing the waste water which has become acidified by large amounts of nitrite nitrogen and nitrate nitrogen resulting from treatment of TMAH being a nitrogen compound in the first contact/aeration tank 16. The calcium carbonate 30 fillers also serve as an immobilizing carrier for aerobic microorganisms including BSK. Also, since calcium of the calcium carbonate 30 fillers is dissolved, the aerobic microorganisms such as BSK can take calcium into their bodies, so that they grow more and that sludge containing such microorganisms readily settles.

Figures 6A, 6B:
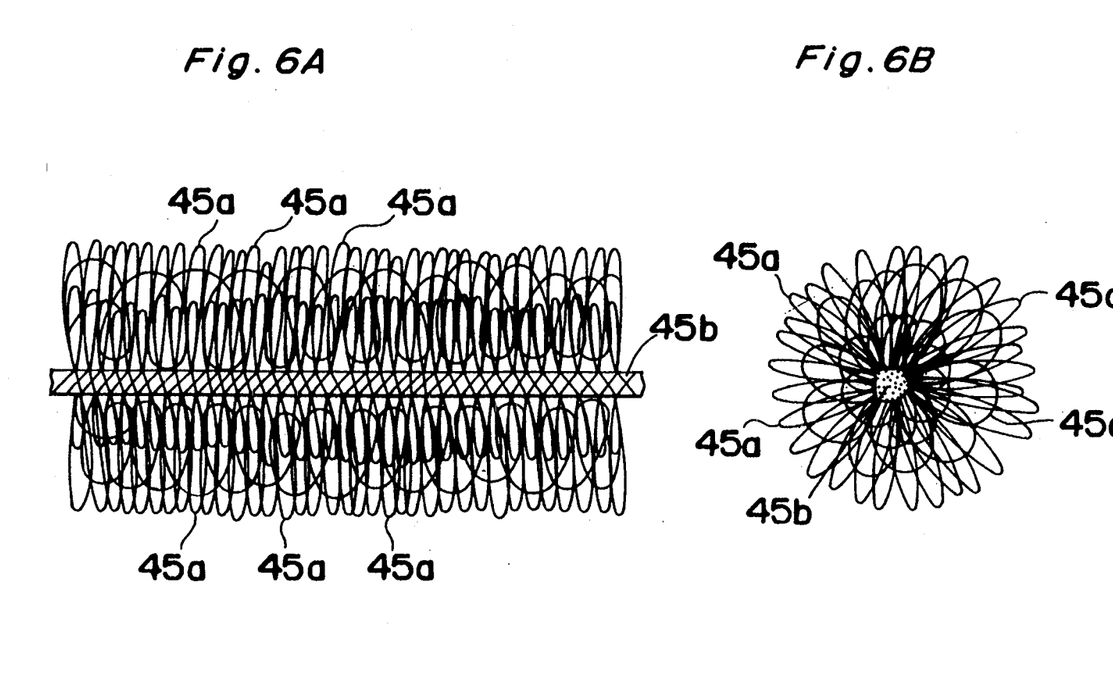
FIG. 6A is a side view of a vinylidene chloride lace.
FIG. 6B is a front view of the vinylidene chloride lace.

On the other hand, since the second contact/aeration tank 19 is also filled with the fibrous vinylidene chloride fillers 45, new activated sludge composed principally of BSK can be maintained at a high concentration within the second contact/aeration tank 19 and, moreover, ammonia nitrogen and nitrite nitrogen generated can be oxidized into nitrate nitrogen. The aforementioned vinylidene chloride fillers 45, composed of thin fibers, are large in surface area, thus preferable as a contact member for oxidizing ammonia nitrogen and nitrite nitrogen into nitrate nitrogen. As shown in FIGS. 6A and 6B, the vinylidene chloride filler 45 consists of an elongated string-like core 45b and a large number of loop elements 45a extending radially from the core 45b. The core 45b at the center of the vinylidene chloride filler 45 is woven of thick yarn and have numerous small pores therein, thus providing a structure facilitating the growth of microorganisms. The vinylidene chloride filler 45 having such a structure is commercially available.

The waste water biologically treated in the second contact/aeration tank 19 is introduced into the second settling tank 21, where the treated water is separated into sludge containing microorganisms and supernatant. Sludge that has settled at the bottom of the second settling tank 21 is introduced into the second mixing tank 20, where it is mixed with BSK and household excess sludge fed from the excess sludge strange tank 28 and agitated to be aerated into new activated sludge, which new activated sludge is then returned to the second contact/aeration tank 19. In comparison between the microorganism concentration (MLSS concentration) of the first contact/aeration tank 16 and that of the second contact/aeration tank 19, the microorganism concentration of the first contact/aeration tank 16 is far higher than the other. This high concentration of microorganisms in the first contact/aeration tank 16 allows developer-containing waste water to be treated without being diluted. Further, the first contact/aeration tank 16 contains newly activated sludge composed principally of BSK having a greater ability of treating organic substances than microorganisms contained in the conventionally activated sludge, and BSK in the newly activated sludge has already been acclimated to TMAH and surfactants. This is also the reason why developer-containing waste water is treated without being diluted.

As described above, three things, BSK, household excess sludge serving as a nutrient for BSK, and return sludge acclimated to low-concentration TMAH and derived from the second settling tank 21, are effectively agitated, aerated, and mixed together in the second mixing tank 20, resulting in new activated sludge. The resulting new activated sludge is introduced into the second contact/aeration tank 19 and sticks/adheres to the vinylidene chloride fillers 45, thereby being immobilized. As a result, the microorganism concentration of the second contact/aeration tank 19 is increased and TMAH is treated more effectively than by the prior-art method.

Figure 3:
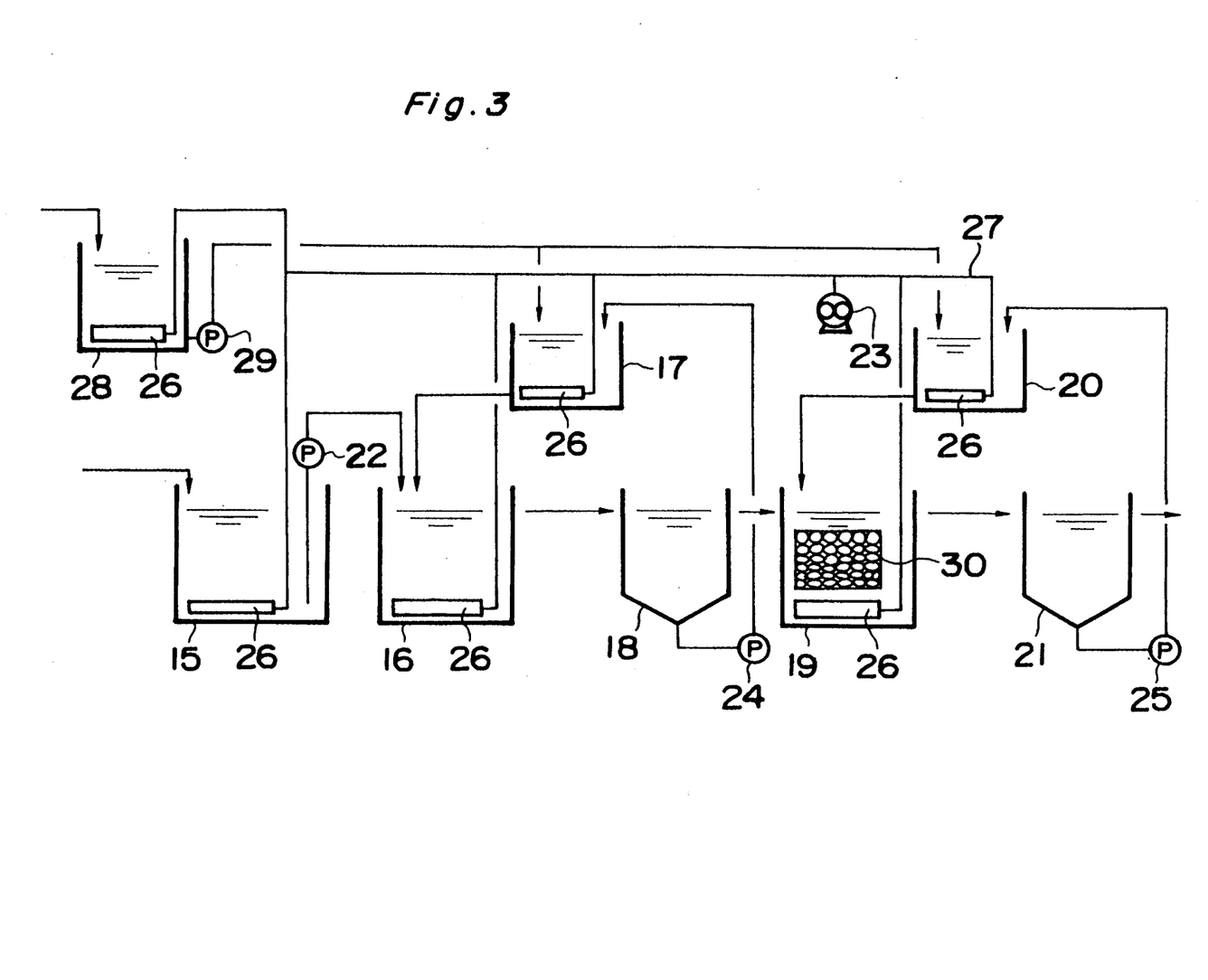
FIG. 3 is a schematic diagram of a variant of the apparatus of FIG. 2.

The vinylidene chloride fillers 45 do not always need to be provided to the first contact/aeration tank 16 and the second contact/aeration tank 19 as shown in FIG. 3, but the microorganism concentration will be higher and the waste water treating power is enhanced when the vinylidene chloride fillers 45 are provided to the first contact/aeration tank 16 and the second contact/aeration tank 19 as in the above described embodiment.

(Second Embodiment)

Figure 4:
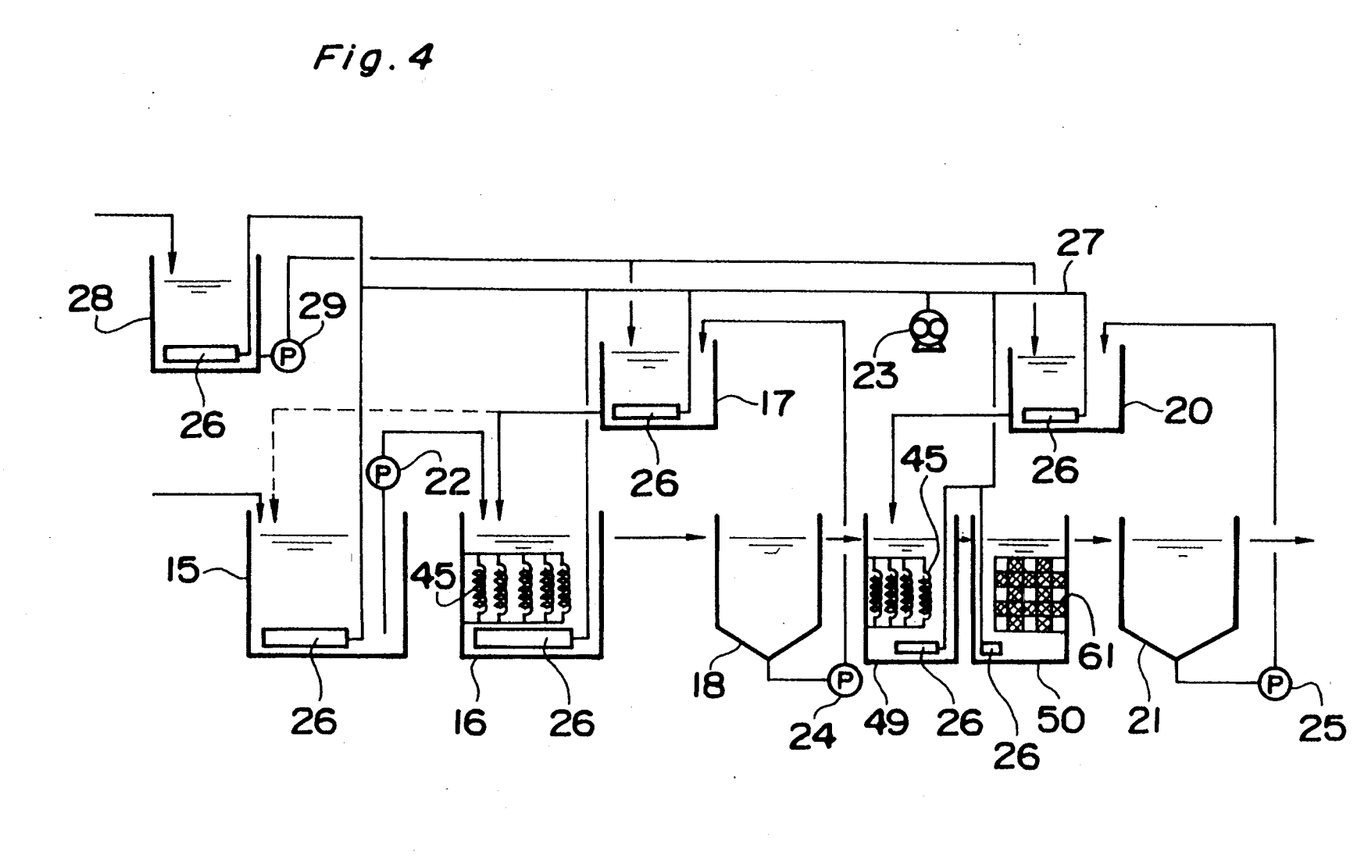
FIG. 4 is a schematic diagram of an apparatus for treatment of developer-containing waste water according to another embodiment of the present invention.

FIG. 4 shows an apparatus for treating developer-containing waste water according to a second embodiment of the present invention wherein waste water is subjected to three-stage biological treatment. The same or similar parts are indicated by the same reference numerals in FIG. 1 and FIG. 4 and a detailed description on those parts is omitted here.

The second embodiment is different from the first embodiment in the following points:

a) Unlike the second contact/aeration tank 16 in the first embodiment treatment apparatus, a second contact/aeration tank 49 as a biological tank in the second embodiment treatment apparatus is not packed with the calcium carbonate mineral. The second contact/aeration tank 49 in the second embodiment is packed only with the vinylidene chloride fillers 45.

b) A third aeration contact tank 50 as a third biological tank is provided between the second contact/aeration tank 49 and the second settling tank 21. The third contact/aeration tank 50 is also provided with an air diffuser pipe 26 connected to the blower 23 for agitating water in the tank and keeping it aerobic. As illustrated in detail in FIG. 5, the third aeration contact tank 50 has multiple mesh tubes 61 disposed horizontally and vertically and spaced from each other within a frame 75. Spaces between the mesh tubes 61 are filled with calcium carbonate mineral 30 and activated carbon 71. Use of activated carbon is desirable but it is not indispensable.

Figure 5:
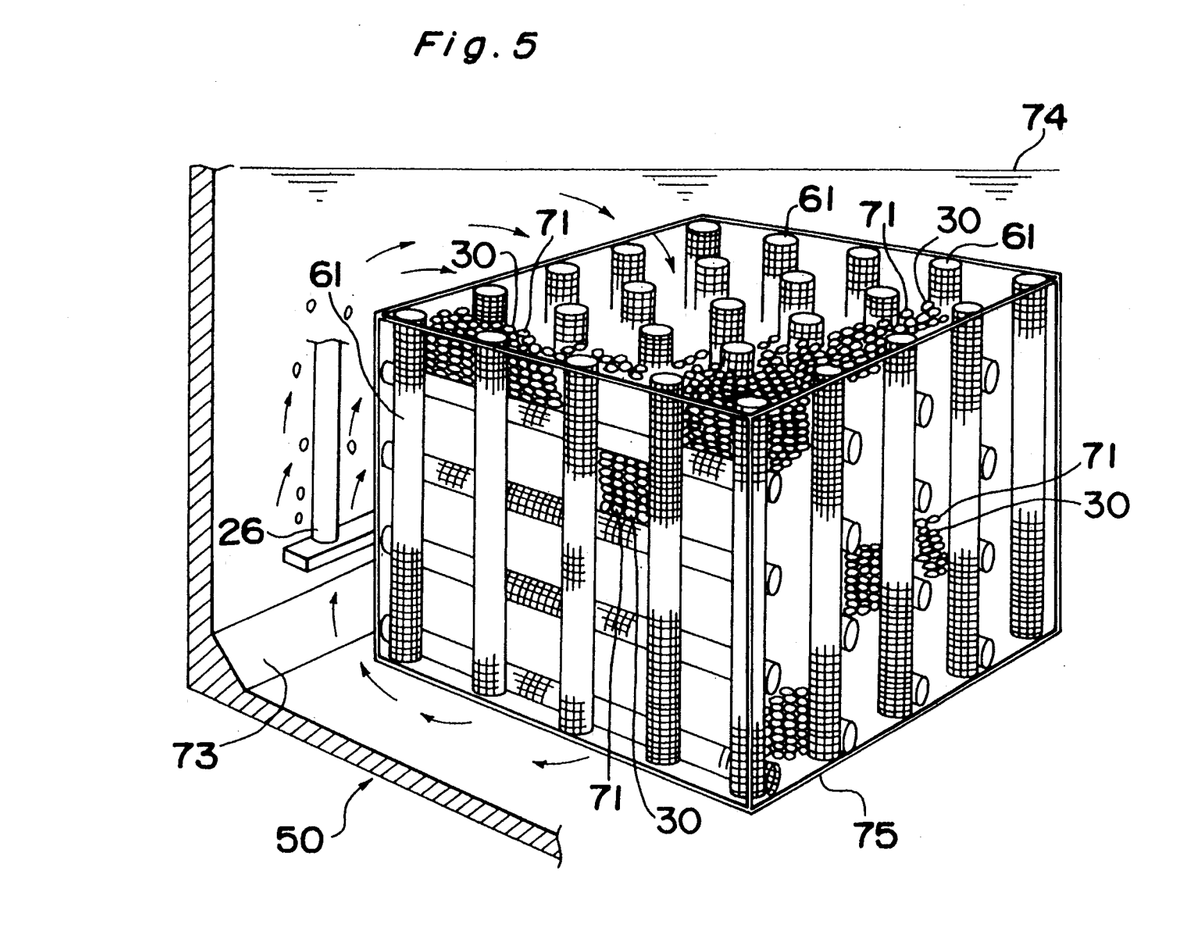
FIG. 5 illustrates a third contact/aeration tank of the apparatus of FIG. 4.

Packing of the vinylidene chloride fillers 45 and calcium carbonate 30 fillers in the separate tanks 49, 50 facilitates agitation of the waste water in the tanks, when compared with packing of those fillers in a single tank as in the first embodiment. In addition, the mesh tubes 61 help water in the tank 50 pass through the calcium carbonate mineral 30 and the activated carbon 71 successfully. Reference numeral 73 indicates a slanted wall.

Waste water introduced to the waste water treatment apparatus of FIG. 4 is treated as follows. The treatment process carried out by the adjustment tank 15, the first contact/aeration tank 16, the first settling tank 18 and the first mixing tank 17 is common to the first and second embodiments and therefore a description is omitted here. The following describes a treatment process carried out after waste water with a TMAH concentration of substantially 200 ppm–1000 ppm is introduced from the first settling tank 18 to the second contact/aeration tank 49.

In the second contact/aeration tank 49, ammonia nitrogen and nitrite nitrogen in the waste water are oxidized into nitrate nitrogen by the new activated sludge composed principally of BSK as done in the second contact/aeration tank 19 of FIG. 2. As described above, the vinylidene chloride fillers 45, fibrous elements having multiple radially looped elements, have a large surface area and therefore is a suitable contact material for oxidizing ammonia nitrogen and nitrite nitrogen into nitrate nitrogen.

As described above with the first embodiment, the core 45b of the vinylidene chloride filler 45 as shown in FIGS. 6A and 6B is woven of thick yarn and have numerous small pores therein, thus providing a structure facilitating the growth of microorganisms.

The more the sludge adheres to the looped elements 45a of the vinylidene chloride filler 45, the less the dissolved oxygen is delivered over the core 45b. As a result, the core 45b becomes anaerobic so that anaerobic bacteria serving for treatment of nitrate nitrogen will grow. Thus, the more the sludge sticks to the looped elements 45a, the more the anaerobic treatment is executed at the core 45b.

Accordingly, in the second contact/aeration tank 49, waste water is de-nitrided by repetition of an aerobic process by aerobic BSK and an anaerobic process by the aforementioned anaerobic bacteria. A retention time of waste water in this second contact/aeration tank 49 is desirably set to 12 hours or longer. In this second contact/aeration tank 49, the TMAH concentration of the waste water can be lowered to 1 ppm or less which almost satisfies a target treatment water quality.

The waste water biologically treated in the second contact/aeration tank 49 is introduced into the third contact/aeration tank 50. Calcium carbonate mineral 30 packed in the third contact/aeration tank 50 serves both as a neutralizer for neutralizing the waste water that has been acidified by a large amount of nitrite nitrogen and nitrate nitrogen generated as a result of treatment of TMAH, a nitrogen compound, in the second contact/aeration tank 49, and as an immobilizing carrier for aerobic microorganisms such as BSK. Also, since calcium is dissolved from the calcium carbonate mineral 72, the aerobic microorganisms such as BSK can take calcium into their bodies, so that they grow and settle easily. On the other hand, surfactants contained in the waste water is adsorbed on the activated carbon 71 in the third contact/aeration tank 50. The activated carbon 71 not only treats the surfactants by itself through adsorption but also facilitates microbial treatment of the surfactants through growth of microorganisms on the activated carbon. The retention time in the third contact/aeration tank 50 is desirably 12 hours or longer.

Since suspended solids (SS) are gathered to the calcium carbonate mineral 72 and the activated carbon 71 in the third contact/aeration tank 50, the treated waste water offers a good transparency, as compared with the prior-art example (where more suspended solids are involved in the settling tank 6, resulting in poor transparency).

The treated water biologically treated in the third contact/aeration tank 50 is introduced into the second settling tank 21, where sludge containing microorganisms are separated from supernatant. The supernatant may be recycled or discharged outside as effluent.

Sludge that has settled at the bottom of the second settling tank 21 is introduced into the second mixing tank 20, where the sludge is mixed with BSK and household excess sludge while being aerated into a new activated sludge, then returned to the second contact/aeration tank 49. In comparison between microorganism concentration (MLSS concentration) of the first contact/aeration tank 16 and that of the second contact/aeration tank 49, the microorganism concentration of the first contact/aeration tank 16 is far higher than the other. This high concentration of microorganisms in the first contact/aeration tank 16 allows developer-containing waste water to be treated without being diluted. Further, the first contact/aeration tank 16 contains new activated sludge composed principally of BSK having a greater ability of treating organic substances than microorganisms contained in the conventional activated sludge and BSK in the new activated sludge has already been accustomed to TMAH and surfactants, so that developer containing waste water is treated without being diluted.

As described above, three things, BSK bacteria, household excess sludge serving as a nutrient for BSK, and return sludge acclimated to low-concentration TMAH and derived from the second settling tank 21, are effectively agitated, aerated, and mixed together in the second mixing tank 20, resulting in a new activated sludge. The resulting new activated sludge is introduced into the second contact/aeration tank 49 and adheres to the vinylidene chloride filler 45, thereby being immobilized. As a result, population of the microorganisms in the second contact/aeration tank 49 increases and TMAH is treated more efficiently than by the prior-art method.

Next, for purposes of comparison of effectiveness of the treatment method of the second embodiment and that of the prior art of FIG. 1, experiments were conducted using the following experimental apparatus. With respect to the experimental apparatus which corresponds to the arrangement of FIG. 4, the adjustment tank 15 was designed to have a capacity of 5 liters, the first contact/aeration tank 16, 20 liters; the first settling tank 18, 3 liters; the second contact/aeration tank 49, 12 liters; the third contact/aeration tank 50, 12 liters; and the second settling tank 21, 3 liters. On the other hand, for the experimental apparatus corresponding to the conventional arrangement of FIG. 1, the adjustment tank 1 was designed to have a capacity of 5 liters, the adsorption tower 2, 1 liter; the dilution tank 3, 1 liter; the neutralization tank 4, 1 liter; the aeration tank 5, 80 liters (the capacity of the aeration tank 5 is far greater than that of the first or second contact/aeration tanks of the present embodiment because dilution water is added to the aeration tank 5); and the settling tank 6, 10 liters.

In the experiments, the above experimental apparatus were operated for treatment of actual influent waste water for about three months and thereafter the treated waste waters were measured with respect to the pH, TMAH, ammonia nitrogen, nitrite nitrogen, nitrate nitrogen, suspended solids, and COD. The water qualities of the influent waste water and the waste waters treated were as listed below.

| (1) Water quality of influent waste water | |
|---|---|
| pH | 12.2 |
| TMAH | 5120 ppm |
| Ammonia nitrogen | 1.0 ppm |
| Nitrite nitrogen | 6.0 ppm |
| Nitrate nitrogen | 6.0 ppm |
| SS (Suspended Solids) | 32 ppm |
| COD (Chemical Oxygen Demand) | 2640 ppm |
| (2) Water quality of the waste water treated by the invention method | |
| pH | 7.2 |
| TMAH | 0.4 ppm |
| Ammonia nitrogen | 0.8 ppm |
| Nitrite nitrogen | 0.6 ppm |
| Nitrate nitrogen | 396 ppm |
| SS (Suspended Solids) | 3.2 ppm |
| COD (Chemical Oxygen Demand) | 73 ppm |
| (3) Water quality of the waste water treated by the prior-art method | |
| pH | 7.8 |
| TMAH | 0.6 ppm |
| Ammonia nitrogen | 376 ppm |
| Nitrite nitrogen | 12 ppm |
| Nitrate nitrogen | 16 ppm |
| SS (Suspended Solids) | 26 ppm |
| COD (Chemical Oxygen Demand) | 70 ppm |

(Surfactants were taken as COD)

As the measurement results indicate, TMAH, which is the principal component of the developer-containing waste water containing surfactants, was positively treated by either experimental apparatus. However, ammonia nitrogen and nitrite nitrogen, which exhibit toxicity to fish, were treated more positively by the invention method than by the prior-art method. Further, suspended solids were also treated more positively by the invention method than the prior-art method. This fact can be verified easily by measuring the transparency of the treated water.

The measurement results also indicate that when surfactants are taken as COD, the experimental apparatus according to the present embodiment has a substantially same COD treatment effect as the experimental equipment of the prior-art example.

Consequently, according to the present embodiment, the waste water treatment ability on the level of the prior art example can be offered at a cost far lower than in the prior-art example.

As apparent from the foregoing description, the present invention has the following advantages.

(1) Developers and surfactants contained in waste water are well treated by the improved waste water treatment method utilizing *Bacilli subtilis* in combination with calcium carbonate mineral.

(2) Since the present invention waste water treatment system dispenses with an adsorption tower housing activated carbon, there is no longer the need for the work of replacing and regenerating activated carbon in the adsorption tower, which work was involved in the conventional waste water treatment method. Therefore treatment costs can be reduced. Also, since developer-containing waste water can be treated without being diluted due to an increased microorganism concentration of the first contact/aeration tank, it is not necessary to use a large tank, unlike the prior-art method of diluting the influent waste water and therefore requiring a tank having a very large capacity. As a result, an overall size of the waste water treatment apparatus is reduced (space saving), and the construction cost and running cost of the apparatus can be reduced to a substantial extent.

(3) Household excess sludges, which require a disposal cost, can be utilized effectively as a nutrient for the microorganisms. Moreover, by virtue of the digesting action of the excess sludge there will be generated less amounts of new excess sludge, so that industrial wastes are reduced.

By virtue of the above advantages, the present invention apparatus and method can treat developer-containing waste water generated from semiconductor and liquid crystal factories much more rationally and economically than the conventional treatment method.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus for treating waste water, comprising:
an adjustment tank having means for agitating raw waste water to equalize water quality of the waste water;
a first biological tank having aeration means for biologically treating the waste water from said adjustment tank with microorganisms while aerating the waste water;
a first settling tank where sludge separates from the waste water from said first biological tank;
a first mixing tank where the sludge from said first settling tank mixes with externally supplied household sludge and *Bacillus subtilis* having means for aerating the mixture and means for transferring the aerated mixture to said first biological tank, said *Bacillus subtilis* having an ability to adhere to a microorganism carrier and an ability to deodorize and decompose organic substances;
a second biological tank having aeration means for biologically treating the waste water from said first settling tank while aerating the waste water, said second biological tank being packed with calcium carbonate;
a second settling tank where sludge separates from the waste water from said second biological tank; and
a second mixing tank where the sludge from said second settling tank mixes with the externally supplied household excess sludge and *Bacillus subtilis*, having means for aerating the mixture and means for transferring the aerated mixture to said second biological tank.

2. The apparatus according to claim 1, wherein the aerated mixture is also transferred from said first mixing tank to said adjustment tank.

3. The apparatus according to claim 1, wherein said *Bacillus subtilis* includes *Bacillus subtilis* Kubota.

4. The apparatus according to claim 1, wherein said first and second biological tanks each have sludge carriers for carrying a sludge thereupon so as to immobilize the sludge.

5. The apparatus according to claim 4, wherein said sludge carrier is comprised of fibrous elements having a multiplicity of looped portions.

6. The apparatus according to claim 5, wherein said fibrous elements are formed of vinylidene chloride.

7. An apparatus for treating waste water, comprising:
an adjustment tank having means for agitating raw waste water to equalize water quality of the waste water;
a first biological tank having aeration means for biologically treating the waste water from said adjustment tank with microorganisms while aerating the waste water;
a first settling tank where sludge separates from the waste water from said first biological tank;
a first mixing tank where the sludge from said first settling tank mixes with externally supplied household sludge and *Bacillus subtilis*, having means for aerating the mixture and for transferring the aerated mixture to said first biological tank, said *Bacillus subtilis* having ability to adhere to the sludge carrying means and an ability to deodorize and decompose organic substances;
a second biological tank having aeration means for biologically treating the waste water from said first settling tank while aerating the waste water;
a third biological tank having aeration means for biologically treating the waste water from said third biological tank while aerating the waste water, said third biological tank being packed with calcium carbonate;
a second settling tank where sludge separates from the waste water from said third biological tank; and
a second mixing tank where the sludge from said second settling tank mixes with the externally supplied household sludge and *Bacillus subtilis*, having means for aerating the mixture and for transferring the aerated mixture to said second biological tank.

8. The apparatus according to claim 7, wherein the aerated mixture is also transferred from said first mixing tank to said adjustment tank.

9. The apparatus according to claim 7, wherein said *Bacillus subtilis* includes *Bacillus subtilis* Kubota.

10. The apparatus according to claim 7, wherein said sludge carrying means of said first and second biological tanks are comprised of fibrous elements having plural looped portions.

11. The apparatus according to claim 10, wherein said fibrous elements are formed of vinylidene chloride.

12. The apparatus according to claim 7, wherein said third biological tank has multiple mesh tubes arranged horizontally and vertically and spaced from each other and wherein the calcium carbonate is placed in spaced between the mesh tubes.

13. The apparatus according to claim 12, wherein said mesh tubes are made of vinyl chloride.

14. The apparatus according to claim 12, wherein said mesh tubes are made of polyethylene.

15. The apparatus according to claim 7, said third biological tank is packed with calcium carbonate and activated carbon.

16. The apparatus according to claim 15, wherein said third biological tank has multiple mesh tubes arranged horizontally and vertically and spaced from each other and wherein the calcium carbonate and calcium carbonate mineral are placed in spaces between the mesh tubes.

17. The apparatus according to claim 16, wherein said mesh tubes are made of vinyl chloride.

18. The apparatus according to claim 16, wherein said mesh tubes are made of polyethylene.

19. The apparatus according to claim 7, wherein said first and second biological tanks each have sludge carrying means for carrying a microorganism-containing sludge thereupon so as to immobilize the sludge.

20. A method for treating waste water, comprising the steps of:
(a) preliminarily adjusting water quality of raw waste water in an adjustment tank;
(b) treating the preliminarily adjusted waste water with microorganisms in a first biological tank while aerating it;
(c) separating by sedimentation sludge from the waste water: and transferring the separated water to a second biological tank;
(d) mixing the sludge separated at step (c) with externally supplied house sludge and *Bacillus subtilis*, aerating the mixture, and transferring the aerated mixture to said first biological tank, said *Bacillus subtilis* having an ability to adhere to a microorganism carrier and an ability to deodorize and decompose organic substances;
(e) treating the waste water transferring to said second biological tank with microorganisms and calcium carbonate while aerating the waste water;
(f) separating by sedimentation sludge from the waste water treated at step (e); and
(g) mixing the sludge separated at step (f) with the household sludge and *Bacillus subtilis*, aerating the mixture, and transferring the aerated mixture to said second biological tank.

21. The method according to claim 20, wherein said aerated mixture is also transferred to said adjustment tank in accordance with the water quality of the raw waste water.

22. The method according to claim 20, wherein *Bacillus subtilis* Kubota is used.

23. The method according to claim 20, providing said first and second biological tanks with a sludge carrier for carrying a sludge thereupon so as to immobilize the sludge.

24. The method according to claim 23, wherein fibrous elements having a plurality of looped portions are used as said sludge carrying means.

25. The method according to claim 24, wherein vinylidene chloride is used as a material of said fibrous elements.

26. The method according to claim 20, wherein a retention time of the waste water in each of said first and second biological tanks is at least 12 hours.

27. A method for treating waste water, comprising the steps of:
(a) preliminary adjusting water quality of raw waste water in an adjustment tank;
(b) treating the preliminarily adjusted waste water with microorganisms in a first biological tank while aerating it, said first biological tank having sludge carrying means for carrying a sludge thereupon so as to immobilize the sludge;
(c) separating by sedimentation sludge from the waste water: and transferring the separated water to a second biological tank;
(d) mixing the sludge separated at step (c) with externally supplied household sludge and *Bacillus subtilis*, aerating the mixture, and transferring the aerated mixture to said first biological tank, said *Bacillus subtilis* having an ability to adhere to the sludge carrying means and an ability to deodorize and decompose organic substances;
(e) treating the waste water transferred to said second biological tank with microorganisms while aerating the waste water;
(f) treating the waste water treated at step (e) with microorganisms and calcium carbonate in a third biological tank while aerating the waste water;
(g) separating by sedimentation sludge from the waste water treated at step (f); and
(h) mixing the sludge separated at step (g) with the household sludge and *Bacillus subtilis*, aerating the mixture, and transferring the aerated mixture to said second biological tank.

28. The method according to claim 27, wherein said aerated mixture is also transferred to said adjustment tank in accordance with the water quality of the raw waste water in said adjustment tank.

29. The method according to claim 27, wherein *Bacillus subtilis* Kubota is used.

30. The method according to claim 27, wherein fibrous elements having a plurality of looped portions are used as said sludge carrying means.

31. The method according to claim 30, wherein vinylidene chloride is used as a material of said fibrous elements.

32. The method according to claim 27, wherein said third biological tank has a plurality of mesh tubes arranged horizontally and vertically and spaced from each other and wherein the calcium carbonate mineral are placed in spaces between the mesh tubes.

33. The method according to claim 27, wherein said third biological tank is packed with calcium carbonate mineral and activated carbon.

34. The method according to claim 33, wherein said third biological tank has a plurality of mesh tubes arranged horizontally and vertically and spaced from each other and wherein the calcium carbonate mineral and activated carbon are placed in spaces between the mesh tubes.

35. The method according to claim 27, wherein a retention time of the waste water in each of said first, second and third biological tanks is at least 12 hours.

36. A system for treating waste water comprising:
an adjustment tank including an equalizer for equalizing water quality of the waste water;
a first biological tank for biologically treating the waste water from the adjustment tank;
a settling tank where sludge separates from the waste water from the biological tank;
a second biological tank containing calcium carbonate for biologically treating the waste water from the settling tank;
a second settling tank where sludge separates from the waste water from the second biological tank and is mixed with *Bacillus subtilis* from a source of *Bacillus subtilis;* and
a transfer mechanism for transferring the mixture to said second biological tank.

* * * * *